US006917184B2

United States Patent
Lai et al.

(10) Patent No.: US 6,917,184 B2
(45) Date of Patent: *Jul. 12, 2005

(54) LI-ION/LI-POLYMER BATTERY CHARGER CONFIGURED TO BE DC-POWERED FROM MULTIPLE TYPES OF WALL ADAPTERS

(75) Inventors: Zheren Lai, Foothill Ranch, CA (US); Edward Bordeaux, Chapel Hill, NC (US); Zen Wu, Irvine, CA (US)

(73) Assignee: Intersil Americas Inc., Milpitas, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 10/850,206

(22) Filed: May 20, 2004

(65) Prior Publication Data

US 2004/0212348 A1 Oct. 28, 2004

Related U.S. Application Data

(63) Continuation of application No. 10/314,543, filed on Dec. 9, 2002, now Pat. No. 6,844,705.

(51) Int. Cl.[7] ................................................. H02J 7/00
(52) U.S. Cl. ...................................................... 320/125
(58) Field of Search ........................................ 320/125

(56) References Cited

U.S. PATENT DOCUMENTS

| | | | | |
|---|---|---|---|---|
| 5,422,559 A | * | 6/1995 | Hall et al. ................. | 320/139 |
| 5,552,953 A | * | 9/1996 | Meyerdirks et al. ....... | 361/93.1 |
| 5,623,195 A | * | 4/1997 | Bullock et al. ............ | 320/153 |
| 5,777,457 A | | 7/1998 | Lee .......................... | 320/137 |
| 6,087,810 A | | 7/2000 | Yoshida .................... | 320/139 |
| 6,326,769 B1 | | 12/2001 | Forsberg ................... | 320/124 |
| 6,586,917 B1 | | 7/2003 | Smith ....................... | 323/280 |
| 6,664,765 B2 | | 12/2003 | Dotzler et al. ............. | 320/162 |
| 2004/0108837 A1 | * | 6/2004 | Lai et al. .................. | 320/137 |

FOREIGN PATENT DOCUMENTS

EP     0385145 A2    2/1990

OTHER PUBLICATIONS

ISL6292 Datasheet, Dec. 2003 (2003–12), pp. 1–19, XP002268925, Intersil.
Channel–Extract, 25–29, Aug. 2003, pp. 1–4, XP002268924.
Li–Ion/Nimh Quick. Charge System in Notebook PC, IBM Tech. Disclosure Bulletin, IBM Corp, New York,US, vol. 38, No. 4, Apr. 1, 1995 pp. 319–320, XP000516168, ISSN: 0018–8689, Whole Document.

* cited by examiner

Primary Examiner—Pia Tibbits
(74) Attorney, Agent, or Firm—Allen, Dyer, Doppelt, Milbrath & Gilchrist, P.A.

(57) ABSTRACT

A battery charger controller is coupled to DC output terminals of an AC-DC (or DC-DC) adapter containing an AC-DC (or DC-DC) converter. A controlled current flow path between input and output terminals of the battery charger controller circuit is controlled to provide a substantially constant current to charge the battery to a nominal battery voltage. When a constant voltage output of the said adapter transitions to a value that limits available charging current to a value less than programmed constant charging current, current flow drive for the controlled current flow path is increased for a limited time interval. Thereafter, the controlled current flow path gradually reduces charging current as the battery voltage remains at its nominal battery voltage until the charge is complete or otherwise terminated.

23 Claims, 4 Drawing Sheets

LI-ION/LI-POLYMER BATTERY CHARGER CONFIGURED TO BE DC-POWERED FROM MULTIPLE TYPES OF WALL ADAPTERS

CROSS-REFERENCE TO RELATED APPLICATION

The present application is a continuation application of U.S. patent application Ser. No. 10/314,543, filed on Dec. 9, 2002, entitled "Li-Ion/Li-Polymer Battery Charger Configured To Be DC-Powered From Multiple Types Of Wall Adapters", by Lai et al, now U.S. Pat. No. 6,844,705, assigned to the assignee of the present application, and the disclosure of which is incorporated herein.

FIELD OF THE INVENTION

The present invention relates, in general, to battery chargers, including those used for charging DC batteries/cells, such as, but not limited to, Li-ion/Li-polymer batteries of the type used to power portable electronic devices, such as laptop/notebook computers, personal digital assistants (PDAs), and the like, and is particularly directed to a new and improved battery charger controller architecture having 'plug-in' compatibility with various types of power adapters, while providing substantially reduced thermal dissipation.

BACKGROUND OF THE INVENTION

Rechargeable, single-cell batteries, such as Li-ion/Li-polymer batteries, are becoming commonplace DC power supply cells for a variety of portable and handheld products. As one would expect, the demand for increased functionality and longer run time of such battery-powered products has resulted in a demand for increased battery cell capacity, with an attendant increase in power required to charge them. A typical single-cell battery charger controller has a relatively compact and portable arrangement, as diagrammatically illustrated in FIG. 1. As shown therein, the charger system includes an external power adapter 10, having an external power pair that is configured to be plugged into a source of external power, such as a 110 VAC wall outlet or automobile electrical system, and a power cable connector 12 that mates with a connector receptacle 22 of a DC-DC converter/charging unit 20. The charger controller unit proper is configured to maintain a battery 30 to be charged.

At present, the majority of DC-DC converter/charging units of such portable battery charger arrangements are based upon a linear transfer function design, such as that diagrammatically shown in FIG. 2. In a linear charger, the wall adapter 10 serves as a DC voltage source and typically has a substantially steady input voltage vs. current characteristic shown in FIG. 3. The charger controller's input voltage as sourced by the adapter 10 may be slightly higher than the nominal (floating) voltage of the battery to be charged, and remains effectively constant over an operating current range set by the charger controller.

The output of the adapter 10 is coupled to a controlled current flow path circuit, such as, but not limited to, a bipolar transistor or MOSFET, shown at 21, the source-drain path through which current flows from the adapter 10 to the battery 30 being charged. A control circuit 25 for controlling the operation of the current flow path circuit 21 has a current sense link 26 (which may be a sense, resistor) which monitors the current through the current flow path circuit 21, as well as a voltage sense link 27 coupled to monitor the voltage of battery 30 as it is charged. The control circuit 25 typically comprises conventionally employed threshold sensor and comparator-based control components of the type used in a variety of current, voltage, and switching control applications.

The operation of the linear charger of FIG. 2 may be readily explained with reference to the waveforms shown in FIGS. 4, 5 and 6. At the beginning of the charging cycle, the battery voltage shown at $V_{BAT}$ in FIG. 4 is at some less-than-nominal value, $V_{BAT0}$. With the MOSFET 21 being rendered conductive by control circuit 25, a prescribed constant charging current $I_{CHG}$ flows through the MOSFET's source-drain path from the adapter 10 and into battery 30. As shown in FIG. 5, this regulated charging current continues to flow up to the point at which the battery voltage reaches its floating (nominal) voltage $V_{BATNOM}$. Once the battery voltage reaches its nominal voltage, the control circuit 25 regulates the battery voltage at this target value, causing the current flowing in the MOSFET 21 to slowly decrease until completion of the charge. As will be appreciated from the foregoing description, and as shown in FIGS. 4 and 5 in particular, a typical linear battery charger exhibits a constant current (FIG. 5)-constant voltage (FIG. 4) charge profile.

In order to match an increase in cell capacity, the charging current needs to increase. However, as shown in FIG. 6, it suffers from substantial thermal dissipation, due to higher charging current. In particular, at the beginning of a recharging cycle a 'fully' discharged battery may exhibit a voltage on the order of 2.5 VDC, and a typical floating voltage value is on the order of 4.2 VDC. If, for example, the input voltage is selected to be 5.0 VDC (which is only 800 MV above the 4.2 V floating voltage) and the battery charging current is one ampere, the thermal dissipation will be (5 V–2.5 V)×1A=2.5 W at the beginning of the charging cycle.

One approach to reduce the thermal dissipation is to employ a pulse charger, such as that illustrated in FIG. 7, which is similar to the linear charger of FIG. 2, except that there is no current sense link, the current limiting function being built into the adapter, as shown by the voltage vs. current relationship of FIG. 8. The operation of a pulse charger may be understood by reference to the diagrams of FIGS. 9, 10 and 11. During constant current mode (FIG. 9), the control circuit 25 fully turns on the current flow/pass element (MOSFET) 21. As a result, the voltage across the pass element will be either a saturation voltage (if element 21 is a bipolar transistor) or, in the FIG. 7 example of using a MOSFET, will be the product of the charging current and ON resistance $R_{ON}$ of MOSFET 21.

As shown in FIG. 8, the adapter 10 operates in a constant current region and its output voltages collapses to a voltage slightly higher than the battery voltage. Thus, the charger does not need to control the charging current, which is limited by the adapter (the charging current source). The thermal dissipation associated with a pulse type of charger is the product of the voltage across the pass element 21 and the charging current. For example, if the charging current is one ampere, as in the linear case, described above, and the ON resistance $R_{ON}$ of the pass element (MOSFET) is 300 milliohms, then the power dissipation will be 0.3 Ohm×1A× 1A=300 mW, a much smaller value than 2.5 W for the case of a linear charger described above.

As shown in FIG. 10, as the battery voltage approaches the floating or nominally fully charged battery voltage, the pulse charger starts to alternately turn the pass element (MOSFET 21) on and off, and gradually reduces the duty ratio of the ON time, until termination of the charging cycle. Power dissipation (shown in FIG. 11) is 300 mW when the pass element is on and zero when it is off. Therefore, the average dissipation is less than 300 mW during the pulse phase.

Although low power dissipation is a principal advantage of a pulse charger, such a charger requires a particular type of adapter—i.e., a current-limiting adapter. The main disadvantage of a pulse charger is the fact that, during pulse mode operation, it produces pulsed voltages at both the input and output of the charger, which constitute potential electromagnetic interference (EMI) noise that may affect the operation of one or more electronic circuits in the device powered by the battery being charged. In addition, the pulse charger may affect the lifetime of the battery and is not recommended by most battery cell manufacturers.

A third type of charger that may be employed is a switching charger. A switching type charger requires more components (including a bulky output inductor) and switches large currents at high speeds, making it the most noisy and complicated among the three types of chargers. It is most practical for high-current applications, such as notebook computers.

SUMMARY OF THE INVENTION

In accordance with the present invention, the above discussed drawbacks of conventional battery charger topologies operating from a plug-in adapter are effectively obviated by a multi-adapter-compatible battery charger controller as described herein. The present invention has the same general circuit topology as the linear charger of FIG. 1 described above, but differs in respect to the operation of its control circuit when powered from a current-source adapter. Upon initialization of a charge sequence with a current-source adapter and a discharged battery, the adapter voltage will first rise to its compliance voltage level until the charge controller demands a fast charge current to the battery.

Upon initialization of the fast charge mode, the charge controller will demand the full current limit set by the controller but will not be able to provide that amount of current because the external adapter is current limited to a value less than the controller-set level. The controller will therefore turn on its control pass element (such as a MOSFET) to minimize the resistance between the adapter output and the battery that is being charged, thereby forcing the adapter to enter its current limit state and consequently bringing its voltage very close to the battery voltage. It maintains that reduced voltage level while sustaining the current limit condition.

The controller UVLO (under-voltage-lock-out) level is lower than for a conventional charger to accommodate the reduced current-limited adapter output voltage. The reduced voltage differential across the controller pass element when the adapter is in current-limit translates into reduced power dissipation as compared to a constant voltage adapter input during this constant current charge phase. The controller will maintain the charge current at this adapter current limit level—with the adapter voltage slightly higher than the battery voltage—until the battery voltage attains its float voltage level. When the battery reaches its float voltage level, the controller will start actively regulating the battery voltage to maintain the prescribed float voltage while reducing the current required of the adapter.

As soon as the controller reduces its current demand from the adapter, the adapter output voltage will very quickly rise ("snap back") to its compliance level as it reverts to its voltage mode regulation. Coincident with this voltage "snap back" is an increase in instantaneous power dissipation (FIG. 15) because the charger current is just slightly reduced from its maximum level while the voltage differential has increased significantly. This dissipation will essentially track the decay in current during the constant voltage phase unless the dissipation is high enough to trigger the controller into its thermal regulation mode.

If the temperature of the controller rises to a prescribed threshold it will begin decreasing the charge current to lower the dissipation and therefore the temperature. This assures that the controller does not abruptly interrupt the charge, as is characteristic of more conventional controller types, but simply moderates the charge rate to a thermally manageable level. This hybrid charging protocol of the present invention yields recharge times comparable to a pulse mode controller and typically faster recharge than a simple constant voltage adapter protocol with the same current limits.

DETAILED DESCRIPTION

Before describing the multi-adapter compatible battery charger in accordance with the invention, it should be observed that the invention resides primarily in an arrangement of conventional DC power supply circuits and control components integrated together. It is to be understood that the invention may be embodied in a variety of implementations, and should not be construed as being limited to only those shown and described herein. For example, although the non-limiting circuit diagrams of the Figures shows the use of MOSFET devices to perform controlled current path operations, it will be appreciated that the invention is not limited thereto, but also may be configured of alternative equivalent circuit devices, such as, bipolar transistors. The implementation example to be described is intended to furnish only those specifics that are pertinent to the present invention, so as not to obscure the disclosure with details that are readily apparent to one skilled in the art having the benefit of present description. Throughout the text and drawings like numbers refer to like parts.

Figure 1:
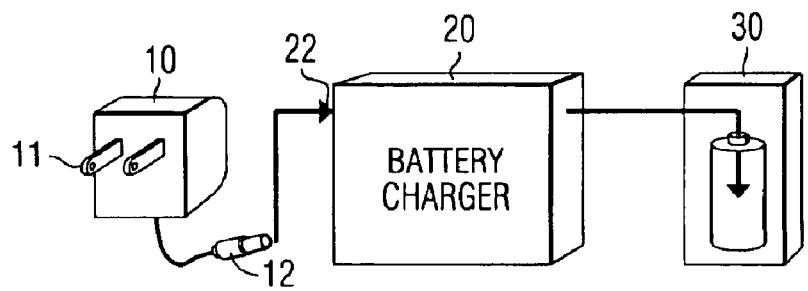
FIG. 1 diagrammatically illustrates a conventional single-cell battery charger.
Figure 2:
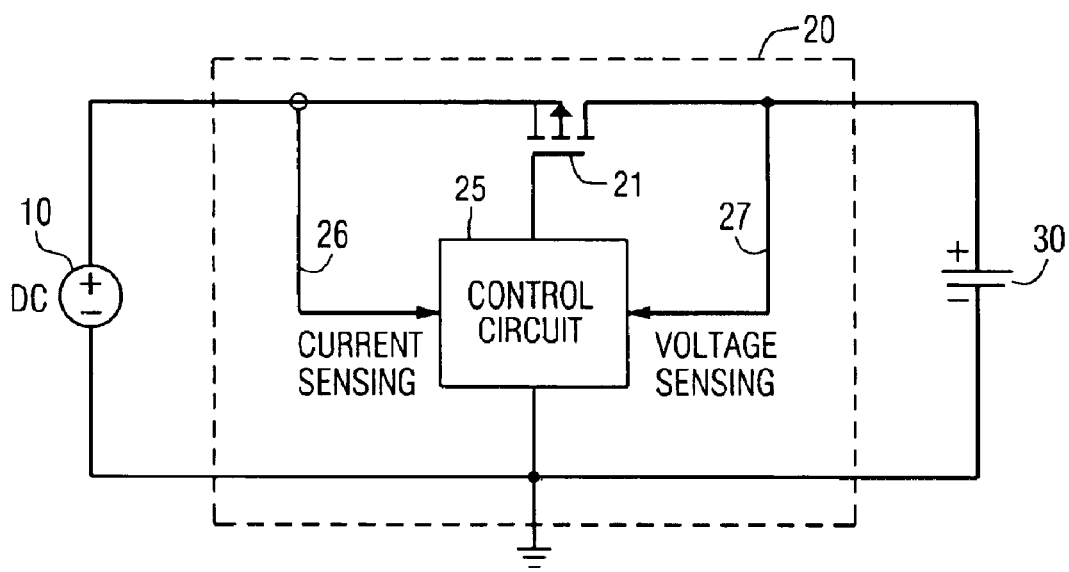
FIG. 2 diagrammatically illustrates the general circuit architecture of a linear battery charger.
Figure 3:
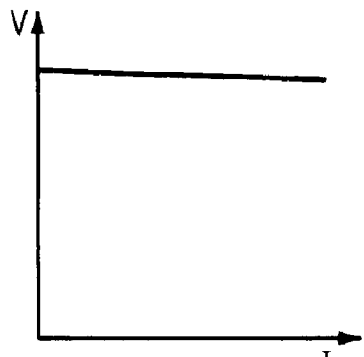
FIG. 3 shows the substantially steady input voltage vs. current characteristic of the linear battery charger of FIG. 2.
Figure 12:
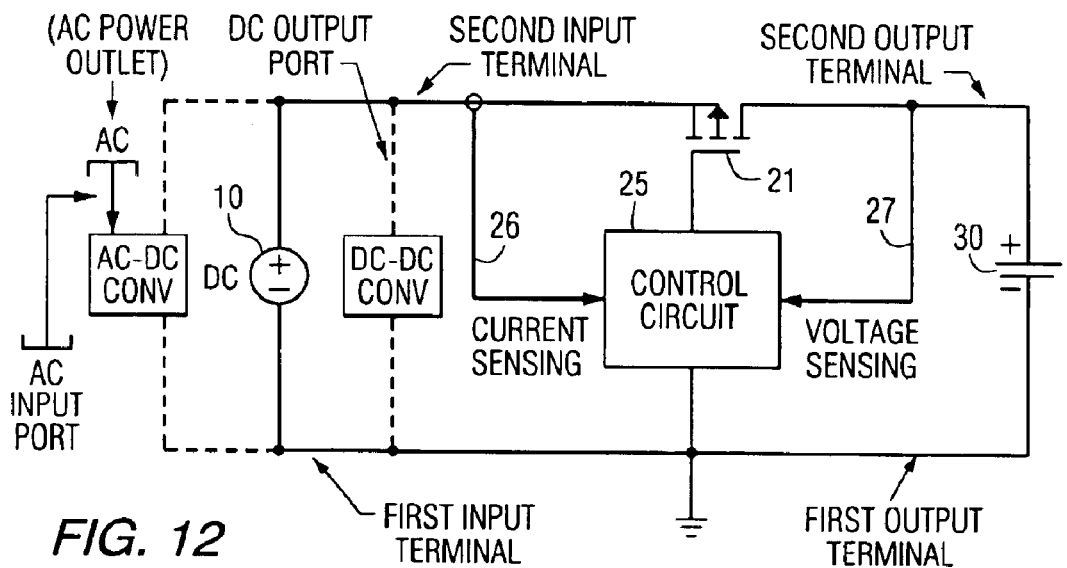
FIG. 12 diagrammatically illustrates the general architecture of a battery charger in accordance with the invention.

Attention is now directed to FIG. 12, which diagrammatically shows an example of an embodiment of a multi-adapter compatible battery charger controller in accordance with the invention. As shown therein, the battery charger controller of the invention has the same general circuit topology as the linear battery charger of FIG. 1. As shown therein the control circuit has a first input terminal coupled to ground and a first output terminal coupled to ground. A source of DC voltage 10 is referenced to ground and has its +output terminal coupled to a second input terminal of the control circuit. A second output terminal of the control circuit is coupled to the voltage sensing line 27 and the +terminal of battery 30. Also shown in broken lines is a DC-DC converter or power adapter with its DC output port coupled to the second input terminal. Also shown in broken lines is an AC-DC converter which has the AC input port thereof coupled to an AC power outlet. The principal difference between the multi-adapter compatible battery charger controller of FIG. 12 and the linear battery charger of FIG. 1 involves the operation of the control circuit 25 when the adapter's constant voltage output transitions to a value that limits the adapter's available charging current to a value $I_{LIM}$ (less than the programmed constant charging current $I_{REF}$). As in the above described linear and pulsed charger circuits, the control circuit 25 employed in the charger of FIG. 12 also uses conventional threshold sensor and comparator-based control components for current and voltage control and switching applications. Rather than detail those components, the present description will describe the input and response parameters employed for executing the control functionality that enable the control circuit to provide the augmented charger capabilities of the invention.

Figure 8:
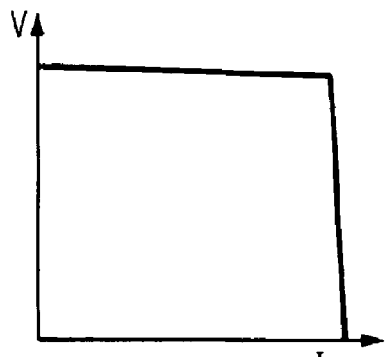
FIG. 8 shows the input voltage vs. current characteristic of the pulsed battery charger of FIG. 7.
Figure 4:
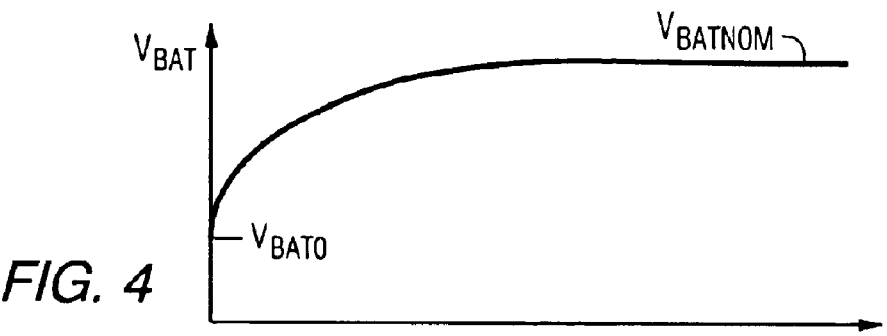
FIG. 4 shows the output voltage vs. charging time characteristic of the linear battery charger of FIG. 2.
Figure 6:
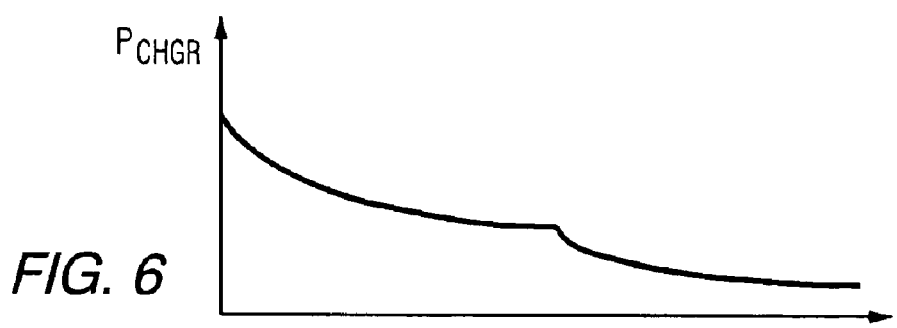
FIG. 6 shows relative power dissipation vs time characteristic of the linear battery charger of FIG. 2.
Figure 7:
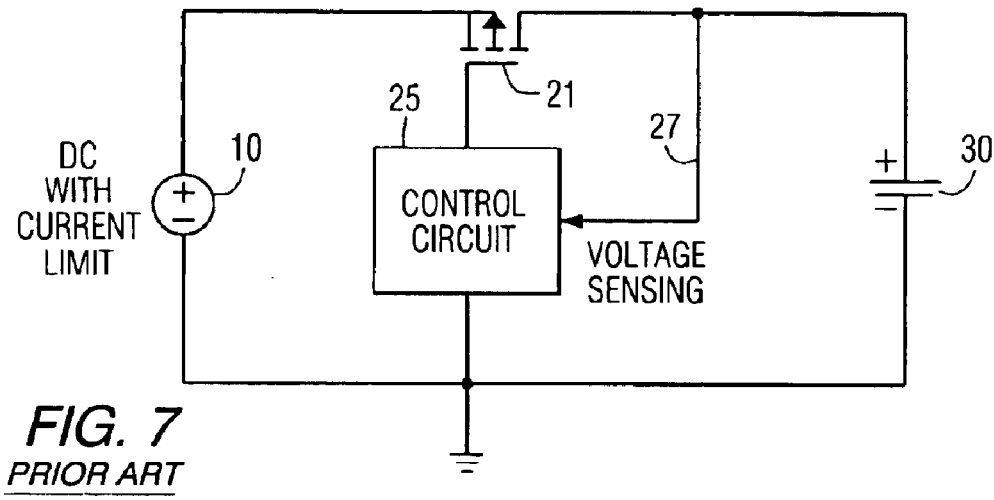
FIG. 7 diagrammatically illustrates the general architecture of a pulsed battery charger.
Figure 9:
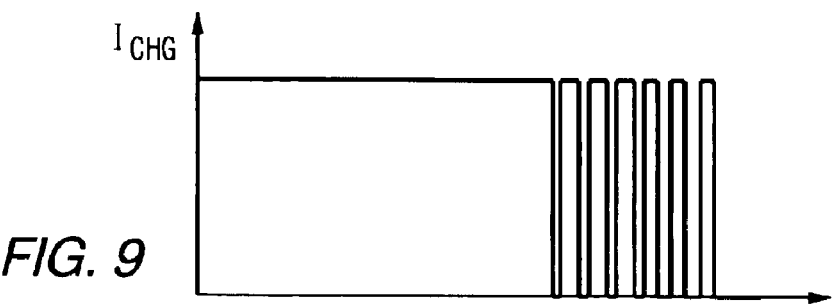
FIG. 9 shows the charging current vs. time characteristic of the pulsed battery charger of FIG. 7.
Figure 10:
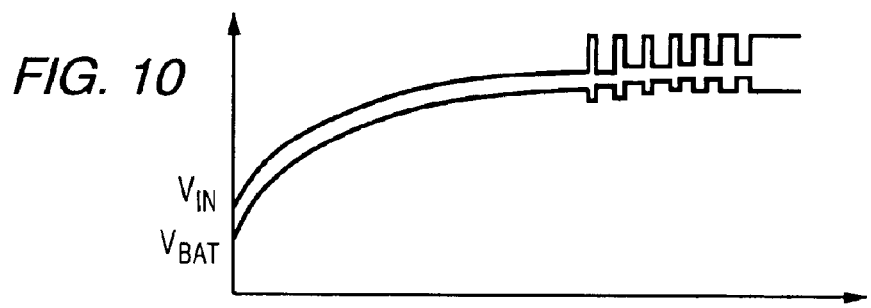
FIG. 10 shows the output voltage and input voltage vs. charging time characteristic of the pulsed battery charger of FIG. 7.
Figure 11:
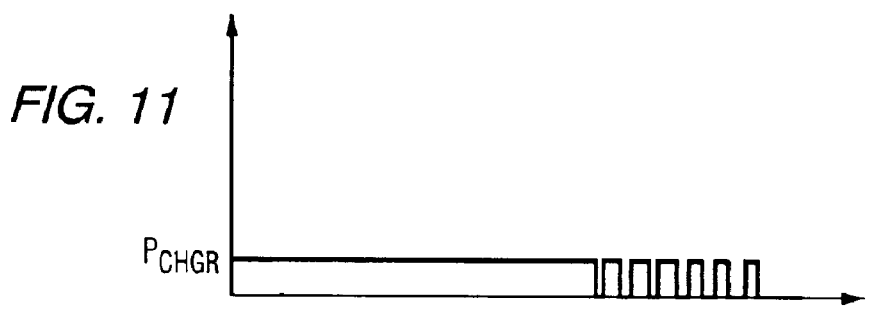
FIG. 11 shows relative power dissipation vs time characteristic of the pulsed battery charger of FIG. 7.
Figure 13:
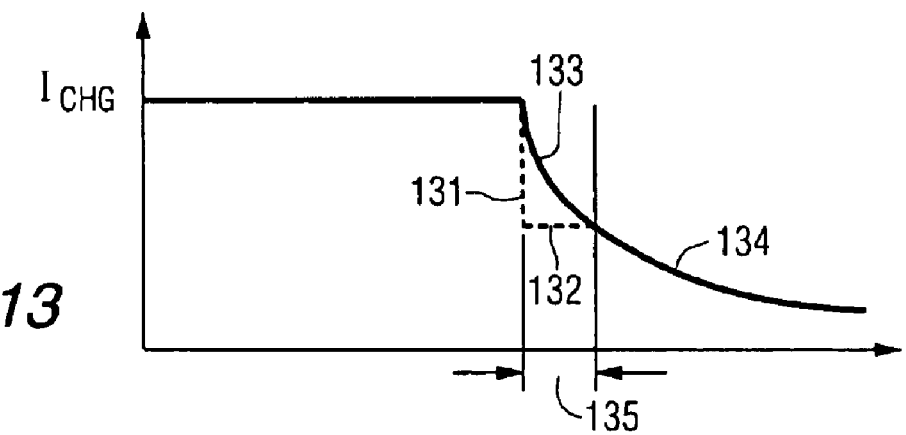
FIG. 13 shows the charging current vs. time characteristic of the battery charger of FIG. 12.
Figure 14:
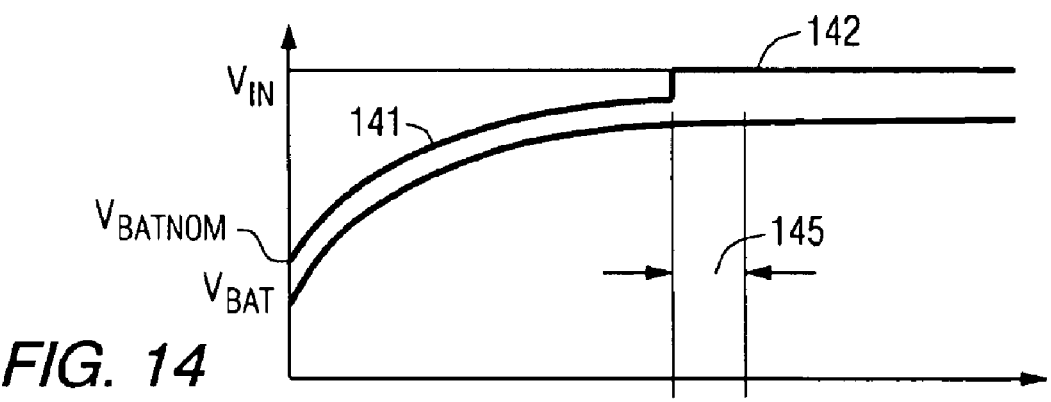
FIG. 14 shows the output voltage and input voltage vs. charging time characteristic of the battery charger of FIG. 12.
Figure 15:
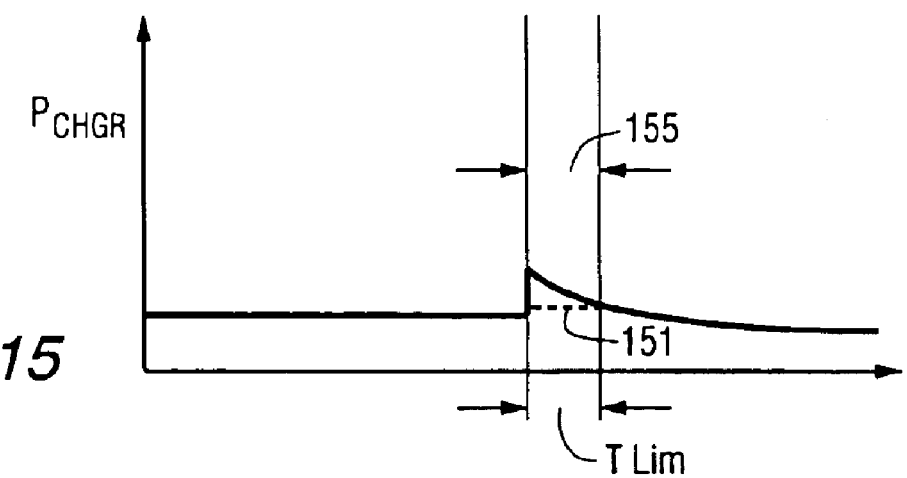
FIG. 15 shows relative power dissipation vs time characteristic of the battery charger of FIG. 12.

Up to the transition point between constant current mode and constant voltage mode, the battery voltage has been gradually increasing, as shown in FIG. 14, from some nominal value $V_{BATNOM}$, and approaching a floating fully charged battery voltage. Upon reaching the current-limiting threshold, the adaptor maintains the charge current at $I_{LIM}$, as shown in FIG. 8, and also by the dotted lines 131–132 of FIG. 13. Since this current (which is monitored by the control circuit 25) is less than the programmed reference current $I_{REF}$, the control circuit 25 responds by enhancing the current throughput of the controlled current flow path circuit which, in the illustrated embodiment, corresponds to an increase in the gate drive to MOSFET 21, so that MOSFET 21 is fully turned on. With MOSFET 21 fully turned on, power dissipation in the charger controller is considerably reduced in comparison to the linear charger operation, as can be seen from a comparison of FIG. 15 with FIG. 6.

As pointed out above, a principal reason that the multiple adapter-compatible charger controller of the present invention is able to operate at high current without large thermal dissipation is the reduced under-voltage lockout (UVLO) level employed. As the battery voltage reaches the floating voltage (FIG. 14), the charger controller current decreases to the adapter's limit value (shown in dotted lines 131 and 132 in FIG. 13). When the adapter starts to operate in the constant voltage region as shown in FIG. 14, the charger controller input voltage jumps from a voltage 141 that was slightly higher than the battery floating voltage to a new constant output voltage 142 of the adapter, that is higher than the floating voltage value.

Figure 5:
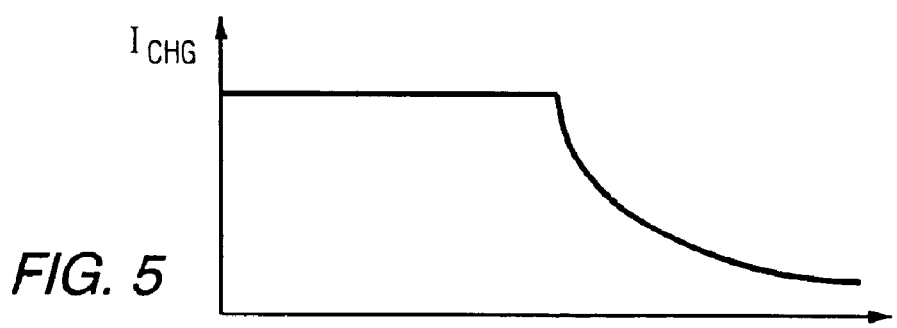
FIG. 5 shows the charging current vs. time characteristic of the linear battery charger of FIG. 2.

Once it has transitioned to this constant voltage mode, the charger controller operates in substantially the same manner as a linear charger. At the very beginning of this constant voltage mode, the value of the charger controller current is still fairly large, which could lead to a fairly large power dissipation. However, due to the use of thermal foldback of the charge current, the charger current characteristic of FIG. 13 undergoes a sharply (stepwise) reduced current value to a level 132, such that the thermal dissipation does not exceed the limit set by the charger controller, as shown with the dotted lines 151 in the power dissipation of FIG. 15. During this reduced charging current interval shown by the boundary lines 135, the charger current value 132 is substantially less than that (curve 133) of a linear charger, described above, and shown in FIG. 5.

While this reduced current flow interval causes a small increase in battery charge time, it occupies only a small fraction of the overall charge time, and therefore has no practical disadvantage. As the charging current continues to decrease, as shown by curve 134 in FIG. 13, the power dissipation reduces further to a value less than the thermal limit, as shown at curve 154 in FIG. 15. Therefore, the charger controller of the invention completes in charging operation in substantially the same manner as a conventional linear charger.

From the above description, it will be appreciated that the charger controller of the present invention has the same thermal performance as a pulse charger, except during the period that the charger operates at its thermal limit. The thermal limit automatically regulates the charge current to a level that the entire operation of the charger circuit is thermally safe. If a voltage source adapter is plugged in, the charger controller of the invention operates the same as a linear charger. The only difference is that if the power dissipation in the charger exceeds the thermal limit, the charger controller will automatically reduce the charging current, so that the circuit is thermally safe.

In addition, once designed for incorporation into a given application, the battery charging circuit of the invention is safe to be used with any popular type of adapter as the power source with correct voltage polarity and range. This type of commonly used low-cost unregulated adapter usually consists of a step-down transformer, a rectifier, and an output filtering capacitor.

While we have shown and described an embodiment in accordance with the present invention, it is to be understood that the same is not limited thereto, but is susceptible to numerous changes and modifications as known to a person skilled in the art. We therefore do not wish to be limited to the details shown and described herein, but intend to cover all such changes and modifications as are obvious to one of ordinary skill in the art.

What is claimed:

1. An apparatus for charging a battery comprising:
   a first input terminal;
   second input terminal;
   a first output terminal arranged to be coupled to a reference voltage, and to a first terminal of said battery;
   a second output terminal arranged to be coupled to a second terminal of said battery;

a controlled current flow path between said second input terminal and said second output terminal; and a control circuit which is operative, in response to a DC power source being coupled to said first and second input terminals, to cause said controlled current flow path to provide a first, substantially constant battery charging current therethrough, so as to charge said battery to a prescribed voltage and, in response to a voltage of said battery reaching said prescribed voltage, to effect a stepwise reduction in the battery charging current to a second, substantially constant battery charging current less than said first, substantially constant battery charging current for a period of time, such that thermal dissipation does not exceed a limit set by said control circuit, and thereafter gradually reducing battery charging current, so as to reduce power dissipation to a value less than a thermal limit.

2. The apparatus according to claim 1, wherein said control circuit is further operative, in response to the voltage of said battery reaching said prescribed voltage, to effect a stepwise increase in input voltage to a constant voltage higher than said prescribed voltage for the duration of said stepwise reduction in the battery charging current to said second, substantially constant battery charging current less than said first, substantially constant battery charging current, and for a time thereafter during which said battery charging current is gradually reduced so as to reduce power dissipation to said value less than said thermal limit.

3. The apparatus according to claim 1, wherein said DC power source comprises an AC-DC converter that is arranged to be connected to an AC power outlet, and having a DC output ports that are arranged to be coupled to said first and second input terminals.

4. The apparatus according to claim 1, wherein said control circuit is operative, in association with said stepwise reduction in the battery charging current to a second, substantially constant battery charging current less than said first, substantially constant battery charging current for said period of time, to increase turn on drive to said controlled current flow path, so that power dissipation in the control circuit is considerably reduced in comparison to a linear charging operation.

5. The apparatus according to claim 1, wherein said controlled current flow path comprises a controlled electronic circuit device having an input-output current flow path coupled between said second input terminal and said second output terminal, and a control terminal arranged to receive a control input from said control circuit that controls current throughput of said input-output current flow path of said controlled electronic circuit device.

6. The apparatus according to claim 5, wherein said controlled electronic circuit device comprises a MOSFET, and said control circuit is operative, in association with said stepwise reduction in the battery charging current to a second, substantially constant battery charging current less than said first, substantially constant battery charging current for said period of time, to increase gate drive to said MOSFET so as to place said MOSFET in a fully turned on condition.

7. The apparatus according to claim 1, wherein said battery comprises an Li-ion/Li-polymer battery.

8. The apparatus according to claim 1, wherein said control circuit exhibits a reduced under-voltage-lock-out level that is lower than the minimal expected battery voltage, to accommodate reduced current-limited adapter output voltage.

9. An apparatus for charging a battery to a prescribed battery voltage comprising first and second input terminals arranged to be coupled to DC output terminals of an AC adapter containing an AC-DC converter, and first and second output terminals arranged to be coupled with first and second terminals of said battery, a controlled current flow path coupled between said first input terminal and said first output terminal, and a control circuit which is operative to cause said controlled current flow path to provide a first, substantially constant battery charging current therethrough, so as to charge said battery to a prescribed voltage and, in response to a voltage of said battery reaching said prescribed voltage for a constant voltage mode of operation, to effect a thermal foldback-based stepwise reduction in the battery charging current to a second, substantially constant battery charging current less than said first, substantially constant battery charging current for a period of time, such that thermal dissipation does not exceed a limit set by said control circuit, and thereafter gradually reducing battery charging current, so as to reduce power dissipation to a value less than a thermal limit.

10. The apparatus according to claim 9, wherein said control circuit is further operative, in response to the voltage of said battery reaching said prescribed voltage, to effect a stepwise increase in input voltage to a constant voltage higher than said prescribed voltage for the duration of said stepwise reduction in the battery charging current to said second, substantially constant battery charging current less than said first, substantially constant battery charging current, and for a time thereafter during which said battery charging current is gradually reduced so as to reduce power dissipation to said value less than said thermal limit.

11. The apparatus according to claim 9, wherein said control circuit is operative, in association with said stepwise reduction in the battery charging current to a second, substantially constant battery charging current less than said first, substantially constant battery charging current for said period of time, to increase turn on drive to said controlled current flow path, so that power dissipation in the control circuit is considerably reduced in comparison to a linear charging operation.

12. The apparatus according to claim 9, wherein said controlled current flow path comprises a controlled electronic circuit device having an input-output current flow path coupled between said second input terminal and said second output terminal, and a control terminal arranged to receive a control input from said control circuit that controls current throughput of said input-output current flow path of said controlled electronic circuit device.

13. The apparatus according to claim 12, wherein said controlled electronic circuit device comprises a MOSFET, and said control circuit is operative, in association with said stepwise reduction in the battery charging current to a second, substantially constant battery charging current less than said first, substantially constant battery charging current for said period of time, to increase gate drive to said MOSFET so as to place said MOSFET in a fully turned on condition.

14. The apparatus according to claim 9, wherein said control circuit exhibits a reduced under-voltage-lock-out level that is lower than the minimal expected battery voltage, to accommodate reduced current-limited adapter output voltage.

15. The apparatus according to claim 9, wherein said battery comprises an Li-ion/Li-polymer battery.

16. A method for charging a battery to a prescribed battery voltage comprising the steps of:

(a) coupling an AC adapter containing an AC-DC converter to a source of AC power, said AC adapter having first and second output terminals from which a DC voltage is supplied;

(b) coupling first and second input terminals of a battery charger circuit to said first and second output terminals of said AC adapter, said battery charger circuit including a controlled current flow path coupled between said first input terminal and a first output terminal of said battery charger circuit;

(c) coupling a battery to be charged to first and second output terminals of said battery charger circuit; and (d) causing said controlled current flow path of said battery charger circuit to provide a first, substantially constant current therethrough from said AC adapter to said battery and charge said battery to said prescribed battery voltage and, in response to a voltage of said battery reaching said prescribed voltage for a constant voltage mode of operation, to effect a thermal foldback-based stepwise reduction in the battery charging current to a second, substantially constant battery charging current less than said first, substantially constant battery charging current for a period of time, such that thermal dissipation does not exceed a limit set by said control circuit, and thereafter gradually reducing battery charging current, so as to reduce power dissipation to a value less than a thermal limit.

17. The method according to claim 16, wherein step (d) further comprises, in response to the voltage of said battery reaching said prescribed voltage, effecting a stepwise increase in input voltage to a constant voltage higher than said prescribed voltage for the duration of said stepwise reduction in the battery charging current to said second, substantially constant battery charging current less than said first, substantially constant battery charging current, and for a time thereafter during which said battery charging current is gradually reduced so as to reduce power dissipation to said value less than said thermal limit.

18. The method according to claim 16, wherein said step (d) comprises, in association with said stepwise reduction in the battery charging current to said second, substantially constant battery charging current less than said first, substantially constant battery charging current for said period of time, increasing turn on drive to said controlled current flow path, so that power dissipation is considerably reduced in comparison to a linear charging operation.

19. The method according to claim 16, wherein said controlled current flow path comprises a controlled electronic circuit device having an input-output current flow path coupled between said second input terminal and said second output terminal, and a control terminal arranged to receive a control input that controls current throughput of said input-output current flow path of said controlled electronic circuit device.

20. The method according to claim 19, wherein said controlled electronic circuit device comprises a MOSFET, and step (d) comprises, in association with said stepwise reduction in the battery charging current to a second, substantially constant battery charging current less than said first, substantially constant battery charging current for said period of time, increasing gate drive to said MOSFET so as to place said MOSFET in a fully turned on condition.

21. An apparatus for charging a battery comprising:
a first input terminal;
a second input terminal;
a first output terminal arranged to be coupled to a reference voltage, and to a first terminal of said battery;
a second output terminal arranged to be coupled to a second terminal of said battery;
a controlled current flow path between said second input terminal and said second output terminal; and
a control circuit which is operative to charge said battery by way of said first and second output terminals, when any of a plurality of different types of DC power sources are coupled to said first and second input terminals.

22. The apparatus according to claim 21, wherein one of said plurality of different types of DC power sources comprises a constant current power source, and wherein another of said plurality of different types of DC power sources comprises a constant voltage—constant currant power source.

23. An apparatus for charging a battery comprising:
a first input terminal;
a second input terminal;
a first output terminal arranged to be coupled to a reference voltage, and to a first terminal of said battery;
a second output terminal arranged to be coupled to a second terminal of said battery;
a controlled current flow path between said second input terminal and said second output terminal; and
a control circuit which is operative to charge said battery by way of said controlled current flow path and said first and second output terminals, said control circuit having a reduced undervoltage lockout level that is lower than the minimal expected battery voltage and employing thermal foldback of the charging current.

* * * * *